July 21, 1942.  K. DAWSON  2,290,410
WORK TABLE SEAT
Filed June 7, 1941
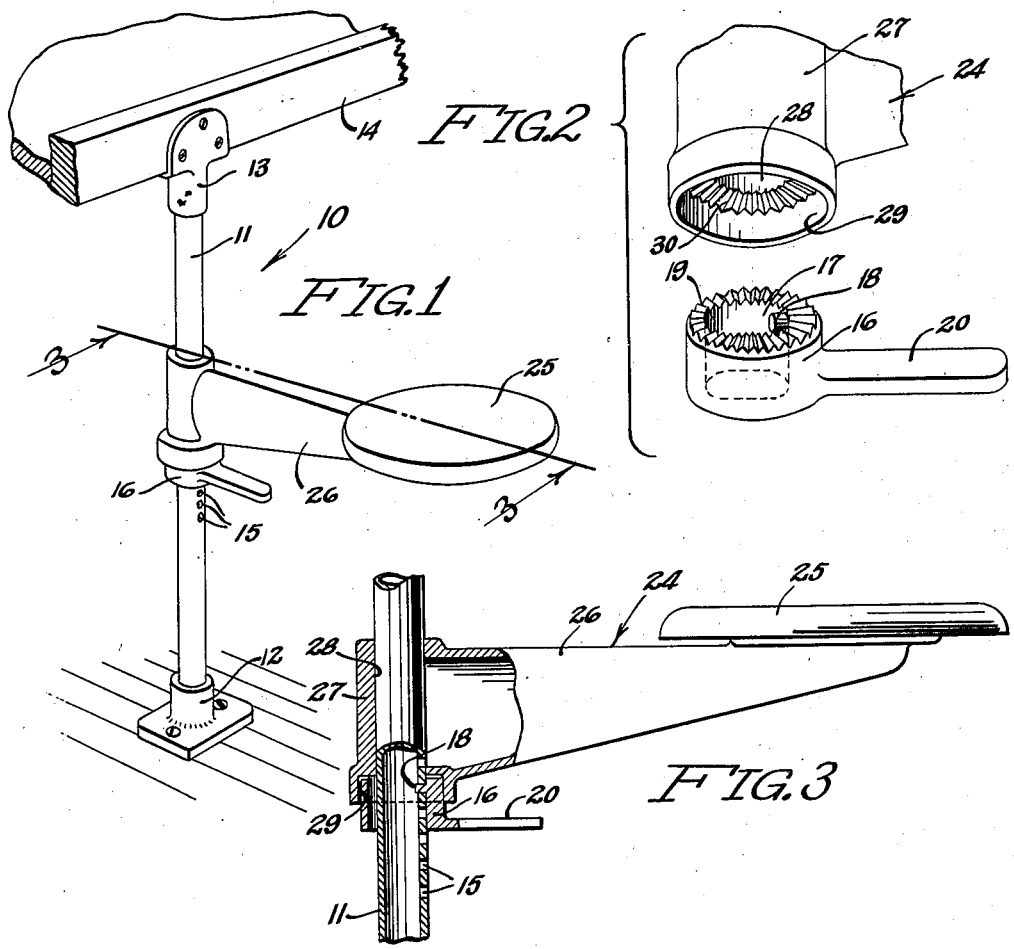
INVENTOR:
KENNETH DAWSON
BY
ATTORNEY Patented July 21, 1942

2,290,410

UNITED STATES PATENT OFFICE 2,290,410

WORKTABLE SEAT

Kenneth Dawson, Riverside, Calif., assignor to Food Machinery Corporation, San Jose, Calif., a corporation of Delaware Application June 7, 1941, Serial No. 397,011

5 Claims. (Cl. 155—82)

This invention relates to seating equipment and has particular utility in packing houses, canneries and the like, where workers of various heights are indiscriminately seated along a work table.

It is an object of this invention to provide a seat for use along a work table which is readily adjustable for height.

In providing seats for workers at work tables, it has become a common expedient to mount such seats on legs of the table so that said seats are provided on the end of an arm thus rotatable on the table leg. It is highly desirable to be able to control the position of such a seat at any given time to prevent the seat rotating about the table leg while a worker is seated thereon.

It is another object of the present invention to provide such a seat mounted on a table leg, as aforesaid, which is susceptible of adjustment to any selected one of plurality of radial positions relative to said leg and which resists a change of radial position while the worker is seated thereon.

The manner of accomplishing the foregoing objects, as well as further objects and advantages, will be made manifest in the following description taken in connection with the accompanying drawing, in which:

Fig. 1 is a perspective view of a preferred embodiment of the invention.

Fig. 2 is a fragmentary enlarged diagrammatic perspective view of the seat arm hub and adjusting collar of the invention in disassembled relation, but disposed relative to each other in the same positions in which they are placed while being assembled.

Fig. 3 is an enlarged fragmentary sectional view taken on the line 3—3 of Fig. 1 and illustrating the seat of my invention adjusted for use at a given height.

Fig. 4 is a view similar to Fig. 3 and illustrating the manner of adjusting the seat of my invention to change this to a different height.

Referring specifically to the drawing, the preferred embodiment of the seat of my invention is designated by the numeral 10, this seat being incorporated with a leg 11 which is supported at its lower end on a floor bracket 12 and at its upper end by a bracket 13, mounted on an edge of a work table 14. The leg 11 is preferably formed of metal tubing and has a series of openings 15 provided one above the other as clearly shown in Figs. 1, 3 and 4.

The seat 10 also includes an adjusting collar 16, having an oblong hole 17 which is just wide enough to permit this hole to receive the leg 11. Provided in one end of this oblong hole 17 is a lug 18, of a size suitable for insertion into any one of the openings 15. The hole 17 is of sufficient length that by shifting the collar horizontally within the limits permissible by the size of said hole the lug 18 may be inserted in or withdrawn from any of the openings 15.

The upper face of the collar 16 is provided with radial teeth 19 and the collar has a handle 20 for manipulation thereof.

The seat 10 also includes a seat arm assembly 24 made up of a seat disc 25 mounted on the end of an arm 26 having a hub 27 a vertical aperture 28 in the latter rotatably receiving the leg 11. The hub 27 has a counterbore 29 in its lower end, the shoulder between this counterbore and the aperture 28 being provided with radial teeth 30 which are adapted to mesh with the teeth 19 on the collar 16.

Operation

The manner of using the seat 10 is as follows:

Figs. 1 and 3 illustrate this when established in a given position for use, it being noted that here the hub 27 is allowed to slide downwardly so that the bore 29 in the lower end thereof receives the upper end of the adjusting collar 16 when the latter has been positioned with the lug 18 extending into one of the openings 15. When the seat has been thus assembled it can be given a selected position for use by rotating the seat assembly 24 about the leg 11, this causing this arm to move up and down as the teeth 19 and 30 pass over one another. When the desired radial position of the seat assembly 24 about the leg 11 has thus been produced the weight of the worker on the seat locks the teeth 30 and 19 together, thereby retaining the seat in its adjusted radial position about the leg 11. Should any change in this radial position be desired, the worker removes his weight from the seat and readjusts the seat radially before again placing his weight thereon.

In order to readjust the seat vertically the worker removes his weight from the seat, and with one hand lifts upon the arm 26 so as to shift the hub 27 upwardly on the leg 11, as shown in Fig. 4. With the other hand, he grasps the handle 20, shifts the lug 18 out of the opening 15 in which it had been disposed. He then shifts the collar 16 upwardly or downwardly, reinserting the lug 18 in another of the openings 15 and allowing the hub 27 to drop downward into embracing relation with the collar 16, as shown in Fig. 3. Obviously, as long as the counterbore 29 of the hub 27 receives the collar 16, as shown in Fig. 3, it is impossible for the lug 18 to be removed from the opening 15 in which it is inserted so that accidental release of the collar 16 from supporting relation with the seat assembly 24 is practically impossible.

It is thus seen that I have provided a seat adapted to be mounted upon a table leg, which is readily adjustable vertically and radially on said leg and retains its radial and vertical adjustment against accidental displacement.

While I have shown and described herein only a single embodiment of my invention, it is to be understood that various modifications and adaptations can be made in this without departing from the spirit of the invention or the scope of the appended claims.

What I claim is:

1. In a seat structure, the combination of: an upright member having openings therein; a seat assembly having a seat, an arm, and a hub, the latter having an aperture which is adapted to rotatably receive said upright member, the lower end of said hub having a counterbore; a collar having a vertical hole with a lug extending inwardly therefrom said hole being adapted to receive said upright member and have sufficient play thereon to permit said lug to be extended into one of said openings or withdrawn therefrom by shifting said collar horizontally said hub being adapted to slide downwardly on said upright member when said lug has been inserted into one of said openings so as to receive the upper end of said collar in said counterbore and lock said collar in place on said member to prevent the withdrawal of said lug from said opening.

2. In a seat structure, the combination of: an upright member having openings therein; a seat assembly having a seat, an arm, and a hub, the latter having an aperture which is adapted to rotatably receive said upright member, the lower end of said hub having a counterbore; a collar having a vertical hole with a lug extending inwardly therefrom said hole being adapted to receive said upright member and have sufficient play thereon to permit said lug to be extended into one of said openings or withdrawn therefrom by shifting said collar horizontally said hub being adapted to slide downwardly on said upright member when said lug has been inserted into one of said openings so as to receive the upper end of said collar in said counterbore and lock said collar in place on said member to prevent the withdrawal of said lug from said opening; and inter-engaging teeth provided on the upper face of said collar and on said hub to restrict radial adjustment of said seat about said member to certain definite radial positions.

3. In a seat structure, the combination of: an upright member; a seat assembly including a seat mounted on an arm, the latter having a hub with an aperture adapted to pivotally receive said upright member so that said seat may be swung thereabout; collar means adapted to receive said member and be disposed beneath said hub to support said seat on said member; locking means on said collar for inter-engaging with said upright member to hold said collar in a fixed vertical position on said member; and means on said hub operating when said hub is dropped downwardly on said collar to restrain said locking means on said collar from disengagement from said upright member until said hub has been lifted upwardly to free said locking means.

4. In a seat structure, the combination of: an upright member; a seat assembly including a seat mounted on an arm, the latter having a hub with an aperture adapted to pivotally receive said upright member so that said seat may be swung thereabout; collar means adapted to receive said member and be disposed beneath said hub to support said seat on said member; locking means on said collar for inter-engaging with said upright member to hold said collar in a fixed vertical position on said member; and means on said hub operating when said hub is dropped downwardly on said collar to restrain said locking means on said collar from disengagement from said upright member until said hub has been lifted upwardly to free said locking means; and a handle on said collar permitting said seat assembly and said locking collar to be manually manipulated co-ordinately for adjusting the vertical position of said seat on said upright member.

5. In a seat structure, the combination of: an upright member; a seat assembly including a hub and a seat and an arm connecting said hub and seat, said hub being pivotally mounted on said upright member; hub supporting means mounted on said member and adjustable to different vertical positions thereon; and means on said hub for holding said supporting means in a given adjusted position on said upright member yet permitting said assembly freedom to rotate about said member while being supported by said supporting means.

KENNETH DAWSON.